(12) United States Patent
Jenko (10) Patent No.: US 10,076,860 B2
(45) Date of Patent: Sep. 18, 2018

(54) UNITARY MONOLITHICALLY FORMED INJECTION-MOLDING APPARATUSES

(71) Applicant: Husky Injection Molding Systems Ltd., Bolton (CA)

(72) Inventor: Edward Joseph Jenko, Essex, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 135 days.

(21) Appl. No.: 14/909,750

(22) PCT Filed: Sep. 10, 2014

(86) PCT No.: PCT/US2014/054875
§ 371 (c)(1),
(2) Date: Feb. 3, 2016

(87) PCT Pub. No.: WO2015/047727
PCT Pub. Date: Apr. 2, 2015

(65) Prior Publication Data
US 2016/0193768 A1     Jul. 7, 2016

Related U.S. Application Data

(60) Provisional application No. 61/884,069, filed on Sep. 29, 2013.

(51) Int. Cl.
*B29C 45/27*    (2006.01)
*B23P 15/00*    (2006.01)
(Continued)

(52) U.S. Cl.
CPC .......... *B29C 45/278* (2013.01); *B22F 3/1055* (2013.01); *B22F 5/007* (2013.01);
(Continued)

(58) Field of Classification Search
CPC ........ B29C 2045/2754; B29C 45/2725; B29C 45/2737; B29C 45/2738
See application file for complete search history.

(56) References Cited

U.S. PATENT DOCUMENTS 5,295,806 A * 3/1994 Gunther .............. B29C 45/2738
                                                           264/297.2
6,109,332 A    8/2000 Sachs et al.
(Continued)

FOREIGN PATENT DOCUMENTS

CN     1429146 A    7/2003
CN   102695593 A    9/2012
(Continued)

OTHER PUBLICATIONS

European Search Report, dated Aug. 21, 2017, 8 pages.
International Search Report, dated Dec. 24, 2014, 3 pages.

*Primary Examiner* — Jill L Heitbrink (57) ABSTRACT

A unitary monolithically formed hot-runner apparatus having at least a manifold containment structure, a hot-runner manifold, at least one nozzle, and one or more spacers. In some embodiments, the manifold containment structure, hot-runner manifold, nozzle(s), and spacer(s) may be multi-material apparatuses of unitary monolithic construction. In other embodiments, a thermal expansion accommodation portion is provided for each nozzle to accommodate thermal growth. Each spacer may be formed of a material having a lower thermal conductivity than the materials of the hot-runner manifold and manifold containment structure and may be made to include a discontinuity to allow for thermal expansion.

32 Claims, 4 Drawing Sheets

(51) Int. Cl.
  *B22F 3/105* (2006.01)
  *B22F 5/00* (2006.01)
  *B29C 33/38* (2006.01)
  *B33Y 10/00* (2015.01)
  *B33Y 80/00* (2015.01)
  *B29L 31/00* (2006.01)

(52) U.S. Cl.
  CPC ........ *B23P 15/007* (2013.01); *B29C 33/3842* (2013.01); *B29C 45/2725* (2013.01); *B29C 2045/2729* (2013.01); *B29C 2045/2787* (2013.01); *B29L 2031/757* (2013.01); *B33Y 10/00* (2014.12); *B33Y 80/00* (2014.12)

(56) References Cited

U.S. PATENT DOCUMENTS

| | | |
|---|---|---|
| 6,669,462 B1 | 12/2003 | Jenko |
| 2004/0140862 A1* | 7/2004 | Brown ................ B81C 1/00126 333/117 |
| 2009/0108500 A1 | 4/2009 | Jenko |
| 2012/0237631 A1 | 9/2012 | Jenko |

FOREIGN PATENT DOCUMENTS

| | | |
|---|---|---|
| EP | 1300232 A1 | 4/2003 |
| JP | H04284217 A1 | 10/1992 |
| JP | H05200800 A1 | 8/1993 |
| JP | 2008114588 A1 | 5/2008 |
| JP | 2013035204 A1 | 2/2013 |
| KR | 20130085836 A | 7/2013 |

\* cited by examiner

UNITARY MONOLITHICALLY FORMED INJECTION-MOLDING APPARATUSES

FIELD OF THE INVENTION

The present invention generally relates to the field of injection molding and more particularly to unitary monolithically formed hot-runner systems for use in molding systems.

BACKGROUND

Injection-molding systems for making molded items often include an injection molding machine, mold plates, and a hot-runner assembly containing a heated manifold that distributes molten material to a set of injection nozzles that are formed separately from the manifold and engaged therewith by suitable means. A hot-runner manifold typically includes body-defining melt channels extending between one or more melt-channel inlets and melt-channel outlets that are in communication with the nozzles. Each injection nozzle, which may be of either a valve-gated type or a hot-tip type, injects one or more molten materials into a mold cavity (or cavities) of a mold through a gate located proximate the injection end of the nozzle. The parts of conventional hot-runner assemblies are fabricated individually and then assembled by skilled technicians.

SUMMARY OF THE DISCLOSURE

It is understood that the scopes of the various aspects of the present invention are limited to the scopes provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted).

In one implementation, the present disclosure is directed to an injection-molding apparatus. The apparatus includes a unitary monolithic body manufactured using a freeform fabrication process, the monolithic body including a manifold having at least one melt channel, and an insulation cavity formed between an inner portion of the monolithic body and an outer portion of the manifold.

In another implementation, the present disclosure is directed to a method of manufacturing a monolithically constructed injection-molding apparatus. The method includes freeform fabricating a manifold containment structure, freeform fabricating a manifold portion within the manifold containment structure so that, when the injection-molding apparatus is complete, the manifold portion is located within a cavity formed within the manifold containment structure, and freeform fabricating at least one spacer extending between the manifold containment structure and the manifold within the cavity in a manner that the at least one spacer is monolithically continuous with each of the manifold containment structure and the manifold.

These and other aspects and features of non-limiting embodiments of various aspects of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In some aspects, the present invention is directed to unitary monolithically constructed injection-molding apparatuses and methods for making such apparatuses. In exemplary embodiments according to the invention, these apparatuses may be manufactured, either in whole or in part, using one or more freeform fabrication processes. By "unitary monolithically constructed" it is meant that two or more components, such as mold plates, hot-runner manifolds, backing plates, nozzles, sprue bushings, etc., that are conventionally manufactured separately and later assembled are formed together using a single forming process. By using fabrication single forming process to manufacture injection-molding apparatuses according to aspects of the invention, the expensive, time-consuming additional step of assembly by skilled technicians required in manufacturing conventional injection-molding apparatuses from individually-fabricated parts can be partially or wholly avoided. Aspects of the invention also allow for individual features of the apparatuses to be manufactured with more accuracy and precision due to the partial or complete elimination of the known cumulative error that results from fabricating parts of a machine individually. Additional benefits of unitary monolithically constructed injection-molding apparatuses of the present disclosure can include, but not be limited to, savings in manufacturing costs, savings in materials, reductions in weight, and, the ability to optimize configurations to operating conditions. After reading this entire disclosure, those skilled in the art will readily appreciate how the present invention can allow injection-molding-equipment designers and manufactures to obtain the foregoing and other benefits.

A unitary monolithic injection-molding apparatus of the present invention may be manufactured, at least in part, in accordance with an additive manufacturing fabrication process, which may also be referred to as a "solid freeform fabrication process." Solid freeform fabrication (SFF) refers to any one of the techniques in a collection of techniques for manufacturing solid objects by the sequential delivery of energy and/or material to specified points in space to produce that solid. SFF is sometimes referred to as "rapid prototyping," "rapid manufacturing," "layered manufacturing," and "additive fabrication." It will be appreciated that SFF is sometimes referred to as freeform manufacturing (FFF). The following are a number of typical techniques for SFF: (A) electron beam melting (fully fused void-free solid metal parts from powder stock); (B) electron beam freeform fabrication (fully fused void-free solid metal parts from wire feedstock); (C) fused deposition modeling (fused deposition modeling extrudes hot plastic through a nozzle, building up a model); (D) laminated object manufacturing (sheets of paper or plastic film are attached to previous layers by either sprayed glue, heating, or embedded adhesive, and then the desired outline of the layer is cut by laser or knife (finished product typically looks and acts like wood); (E) laser-engineered net shaping (a laser is used to melt metal powder and deposit it on the part directly; this has the advantage that the part is fully solid and the metal alloy composition can be dynamically changed over the volume of the part); (F) POLYJET MATRIX (the first technology that enables simultaneous jetting of multiple types of materials); (G) selective laser sintering (selective laser sintering uses a laser to fuse powdered metal, nylon, or elastomer; additional processing is necessary to produce fully dense metal part); (H) shape deposition manufacturing (part and support materials are deposited by a printhead and then machined to near-final shape); (I) solid ground curing (shines a UV light on an electrostatic mask to cure a layer of photopolymers; uses solid wax for support); (J) stereolithography (stereolithography uses a laser to cure liquid photopolymers); (K) three-dimensional printing (this label encompasses many technologies of modern 3D printers, all of which use inkjet-like printheads to deposit material in layers; commonly, this includes, but is not limited to, thermal phase change inkjets and photopolymer phase change inkjets); and/or (L) robocasting (robocasting refers to depositing material from a robotically-controlled syringe or extrusion head).

Another example of a manufacturing method for making the unitary monolithic apparatus is to use a non-solid freeform fabrication, such as casting. Casting is a manufacturing process by which a liquid material is usually poured into a mold, which contains a hollow cavity of the desired shape, and then allowed to solidify. The solidified part is also known as a casting, which is ejected or broken out of the mold to complete the process. Casting materials are usually metals or various cold setting materials that cure after mixing two or more components together; examples are epoxy, concrete, plaster and clay. Casting is most often used for making complex shapes that would be otherwise difficult or uneconomical to make by other methods. In many cases, selective laser sintering (SLS) may be preferable due to the fact that it does not require support structures. Parts being constructed via SLS are surrounded by unsintered powder at all times; this allows for the construction of complicated geometries.

Figure 1:
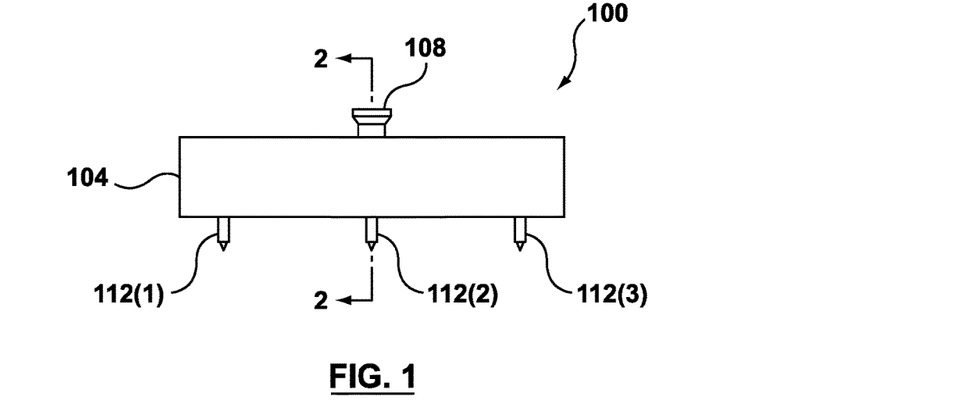
FIG. 1 is a side view of a unitary monolithically formed injection-molding apparatus according to an aspect of the invention.
Figure 2:
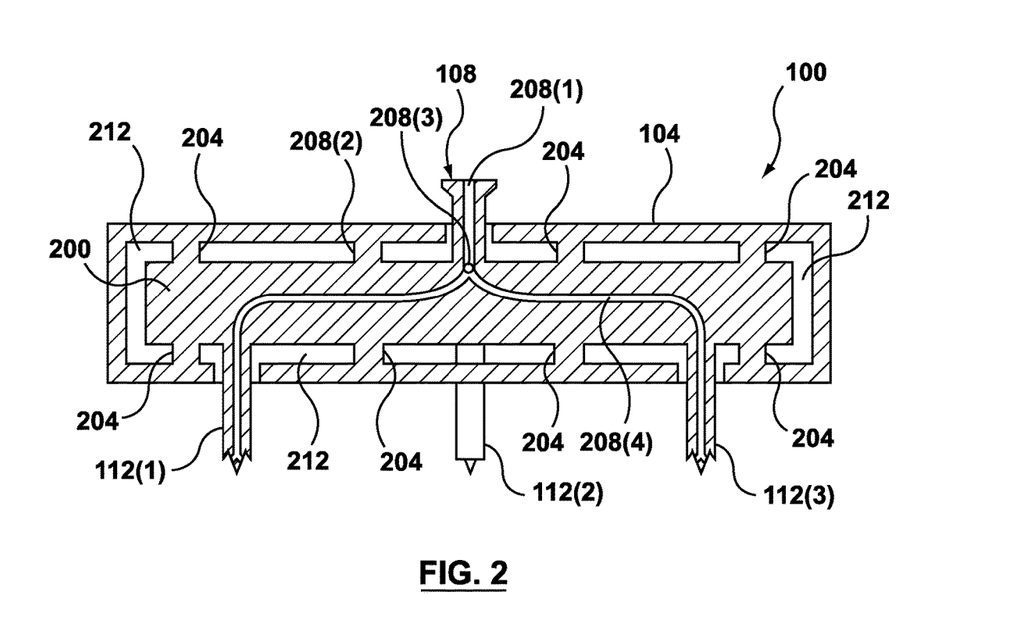
FIG. 2 is an enlarged cross-sectional view of the unitary monolithically formed injection-molding apparatus of FIG. 1 as taken along line 2-2.

Turning now to the figures, FIG. 1 illustrates a unitary monolithically constructed injection-molding apparatus, in particular a hot-runner apparatus 100, made in accordance with the invention. In this example, hot-runner apparatus 100 includes a manifold containment structure 104, a sprue bushing 108, and a plurality of nozzles, here four nozzles, three of which, i.e., nozzles 112(1), 112(2), and 112(3), are visible in FIG. 1, which are all formed as a unitary monolithic body using a suitable fabrication technique, such as one of the SFF casting techniques noted above. In order to show the unitary monolithic nature of hot-runner apparatus 100, FIG. 2 provides a sectional view of the apparatus. As can be readily seen in FIG. 2, sprue bushing 108 and manifold containment structure 104, along with a hot-runner manifold 200 and a set of spacers 204, are formed as a single part. As can also be seen in FIG. 2, hot-runner manifold 200 and nozzles 112(1) to 112(3) are provided with melt channels, of which four melt channels 208(1) to 208(4) are illustrated. Through freeform fabrication, for example, the melt channels, including melt channels 208(1) to 208(4), can be manufactured with any desired shape, such as the curved shape shown in FIG. 2, among others. Spacers 204 can provide an insulation cavity 212 (or several insulation cavities, only a few regions labeled to avoid clutter) that help to insulate hot-runner manifold 200 from, for example, manifold containment structure 104 and the mold (not shown).

Figure 3A:
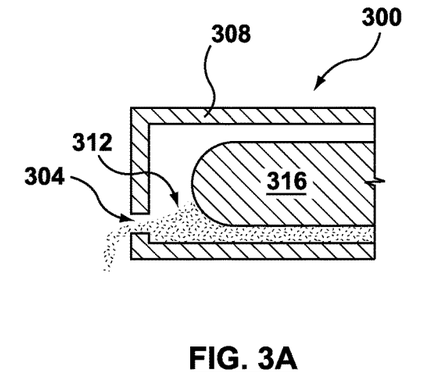
FIG. 3A is a cross-sectional partial view of a unitary monolithically formed injection-molding apparatus having a material removal port and a closure for the material removal port.

As described above, some types of freeform fabrication fuse powdered material in order to form parts. For example, selective laser sintering uses a laser to fuse powdered nylon, elastomer, or metal, layer by layer, into a given part. An injection-molding apparatus according to the present invention, such as the hot-runner apparatus 300 of FIG. 3A, can be realized using one of these types of freeform fabrication by building one or more material-removal port(s) into the manifold containment structure, like material-removal port 304 of FIG. 3A is built into a manifold containment structure 308. Such a material removal port 304 allows for excess unfused material 312, such as that which may be present between the hot-runner manifold 316 and manifold containment structure 308, to be evacuated. Removal of unfused material may be accomplished with any one or more of: one or more material removal ports, a vacuum, compressed or forced air, injection of chemical solvents, and/or any other suitable methods.

Figure 3B:
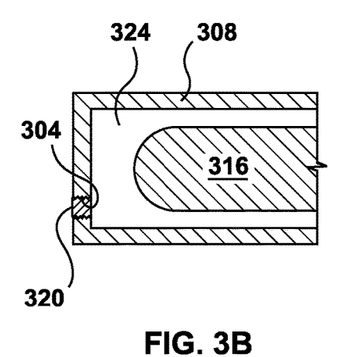
FIG. 3B is a cross-sectional partial view of the unitary monolithically formed injection-molding apparatus of FIG. 3A having a material removal port showing excess material being removed.

After the excess unfused material has been evacuated, a separately formed closure can be installed in each of the one or more material removal port(s), as shown in FIG. 3B with closure 320 being installed into material-removal port 304. Installing closure 320 seals the internal space 324 between hot-runner manifold 316 and manifold containment structure 308 to create an insulative air space. In alternative embodiments, internal space 324 can be filled with a suitable insulation material, such as an insulative aerogel (not shown), among others. Closure 320 may be permanently or removably fixed within material-removal port 304. In the example shown, closure 320 is threadingly engaged within material-removal port 304. As shown in FIGS. 3A and 3B, the hot-runner manifold 316 has an elliptical cross-section in contrast to rectangular cross-section manifold 200 shown in FIG. 2. This is intended to illustrate the abundance of designs that can be implemented using freeform fabrication manufacturing techniques. The elliptical cross-section of hot-runner manifold 316 in FIGS. 3A and 3B may provide, for example, more efficient use of the forming material and/or better insulation characteristics between the manifold and manifold containment structure 308 than would be possible using traditional manufacturing techniques.

When a material-removal port and closure, such as port 304 and closure 320 are used, in some cases it can be beneficial to be able to remove the closure for inspection and/or maintenance of the injection-molding apparatus. Such inspection and/or maintenance may be performed through the use of a borescope/endoscope/laprascope or any other suitable tools. In such cases, tools normally associated with the surgical arts can be used, possibly with some modification, in order to make repairs to injection-molding apparatuses manufactured according to aspects of the present invention. Robotics, vibration-damping stabilizer computer processes, and/or virtual reality simulators may be used to automate or assist with such inspection and/or maintenance work.

Figure 4:
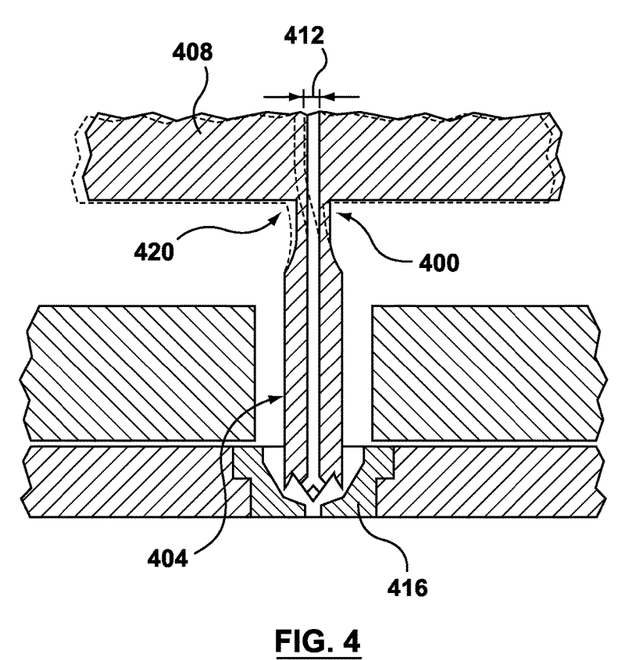
FIG. 4 is a cross-sectional partial view of a unitary monolithically formed injection-molding apparatus that includes an integrated nozzle according to an aspect of the invention, showing the nozzle engaged with a mold and wherein the apparatus includes an intentional flexing region that accommodates thermal growth.

In order to account for and accommodate thermal growth of a hot-runner manifold made in accordance with the present disclosure relative to, for example, a mold gate insert, it can be beneficial to provide a thermal expansion accommodation portion at or near the root of each of one or more of the nozzles, i.e., at or near the junction between the nozzles and the hot-runner manifold. For example, as shown in FIG. 4, such a thermal expansion accommodation portion 400 can take the form of a reduced-radius portion, or neck, and, as such, designed to have a section modulus (or moment of inertia) smaller than a section modulus (or moment of inertia) of the nozzle 404 itself. In use, the hot-runner manifold 408 and nozzle 404 can reach high temperatures, which can lead to an offset 412 between the nozzle and the gate insert 416 and/or to extremely high stress forces at the interface 420 between the manifold and nozzle. As depicted in FIG. 4 (solid lines illustrate the nozzle 404 and hot-runner manifold 408 in a cool state; dashed lines illustrate the expansion and bending between the manifold and nozzle when they are heated), a thermal expansion accommodation portion 400 can be designed to accommodate any expansion and/or offsetting that occurs as a result of the differential in expansion between hot-runner manifold 408 and gate insert 416.

It is emphasized that FIG. 4 only depicts one example of a thermal expansion accommodation portion, i.e., thermal expansion accommodation portion 400; in light of this disclosure, it will be apparent to one of ordinary skill in the art that thermal expansion accommodation portions having differently-shaped and/or asymmetrical cross-sections, differently-shaped and/or asymmetrical profiles, and longer or shorter thermal expansion accommodation portions are all possible and can be preferable, depending on the application. It is further emphasized that not all nozzles within any given injection-molding apparatus need have the same thermal expansion accommodation portion; in fact, it can be preferable to use different thermal expansion accommodation portions for different nozzles of a given injection-molding apparatus built according to the invention based on, e.g., their proximity to the sprue bushing and/or their individual movement due to thermal expansion within the apparatus and relative to other parts of the apparatus, such as the gate insert, during use.

Figure 5:
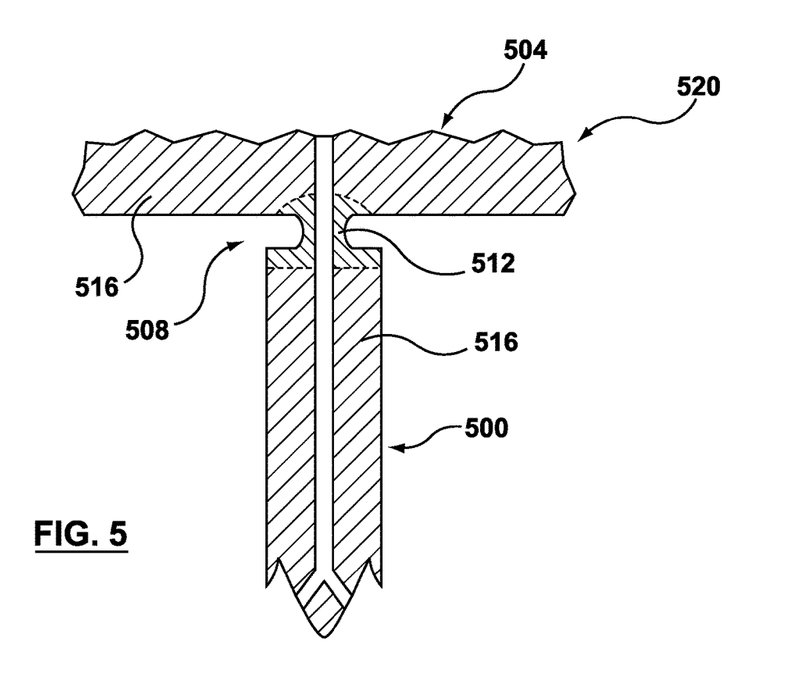
FIG. 5 is a cross-sectional partial view of another unitary monolithically formed injection-molding apparatus having an alternative nozzle flexing region according to an aspect of the invention.

FIG. 5 illustrates a nozzle 500 extending from a hot-runner manifold 504 and having a thermal expansion accommodation portion 508 of a different configuration from that shown in FIG. 4. As can be clearly seen upon comparing FIGS. 4 and 5, thermal expansion accommodation portion 508 shown in FIG. 5 has a differently-shaped, shorter profile and is formed of a different material. The material 512 used for thermal expansion accommodation portion 508 of FIG. 5 is selected to be more flexible and resilient than the material(s) 516 used for the rest of hot-runner manifold 504 and the rest of nozzle 500. For example, material(s) 516 of the rest of hot-runner manifold 504 and the rest of nozzle 500 may be selected to satisfy one or more other criteria, such as strength, rigidity, hardness, abrasion resistance, and thermal conductivity, among others. Various freeform fabrication techniques can allow for the monolithic integration of more than one material into an injection-molding apparatus, such as hot-runner apparatus 520 of FIG. 5. For example, for powder-fusion techniques, at an appropriate time, the type of powder deposited prior to fusing can be changed either locally to each region where the material is desired or globally to an entire fabrication bed, depending upon the type of equipment used. As another example, for molten wire techniques, the type of wire used can be changed at each region where the particular material is needed. After reading this entire disclosure, those skilled in the art will understand how to select the appropriate materials and appropriate fabrication process(es) for making a particular instantiation of a multi-material unitary monolithic injection-molding apparatus of the present disclosure.

Figure 6A:
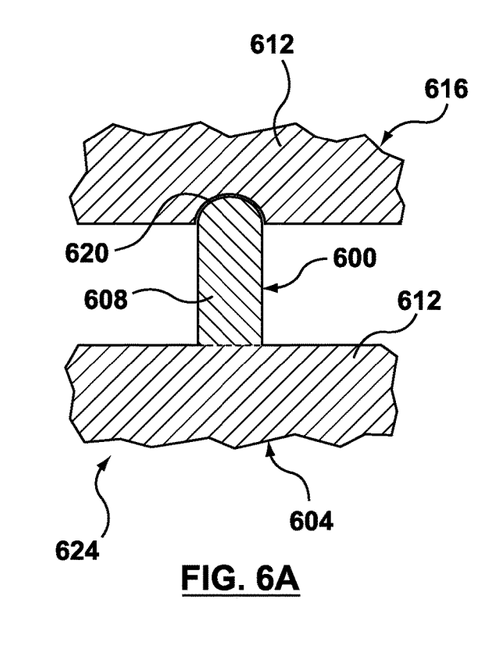
FIG. 6A is a cross-sectional partial view of a unitary monolithically formed injection-molding apparatus having an integrally formed spacer according to an aspect of the invention.
Figure 6B:
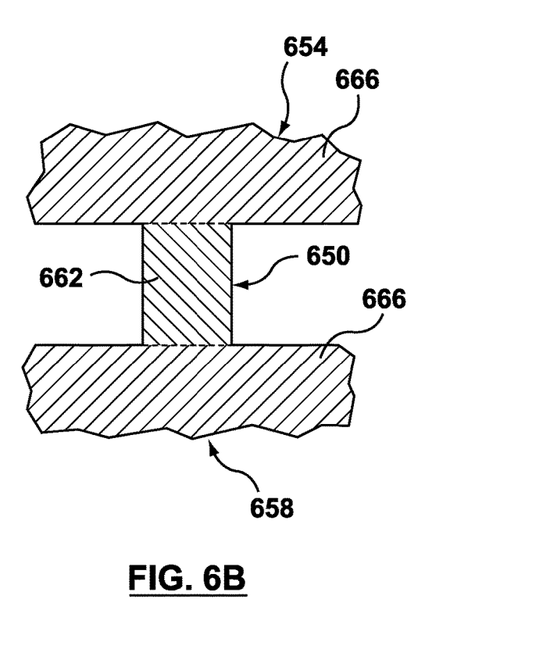
FIG. 6B is a cross-sectional partial view of another unitary monolithically formed injection-molding apparatus having an alternative integrally formed spacer according to an aspect of the invention.

FIGS. 6A and 6B illustrate, respectively, spacers 600 and 650 that have been designed to better insulate and/or enable better flexibility than, for example, spacers 204 shown in FIG. 2. As shown in FIG. 6A, spacer 600 can be fused to the manifold containment structure 604 and formed of a different material 608 (e.g., a lower thermal conductivity material and/or a more flexible material) than the material 612 of the manifold containment structure and the material of the hot-runner manifold 616. The curved, unfused discontinuity 620 shown in FIG. 6A at the interface between spacer 600 and hot-runner manifold 616 allows the manifold to expand and contract relatively freely without causing extreme stresses on the freeform-fabricated injection-molding apparatus 624. Various freeform-fabrication techniques allow for discontinuities in otherwise unitary monolithic structures. For example, well-controlled fusion in powder-fusion techniques can permit one or more layers of powder to not be fused over a desired region. The unfused material, if the unfused region is configured properly, can allow the adjacent parts to slide relative to one another (here in the direction into and out of the page of FIG. 6A), even if it remains present in the discontinuity because it cannot freely flow out therefrom. While this may result in a relatively high friction between the two parts, the parts can still move relatively unconstrained.

FIG. 6B illustrates alternative spacer 650 that has been formed monolithically with both the hot-runner manifold 654 and the manifold containment structure 658 but is still formed of a different material 662 (e.g., a lower thermal conductivity material and/or a more flexible material) than the material(s) 666 of the manifold containment structure and the manifold. Exemplary techniques for unitarily and monolithically forming spacers 650 with hot-runner manifold 654 and manifold containment structure 658 are described above in connection with FIG. 5. Depending on the application, spacers 204 like those shown in FIG. 2 may be sufficient; however, in some cases, it will be necessary to use spacers like spacers 600 and 650 shown in FIGS. 6A and 6B, respectively, in order to ensure sufficient durability, resilience, and heat handling properties.

Figure 7:
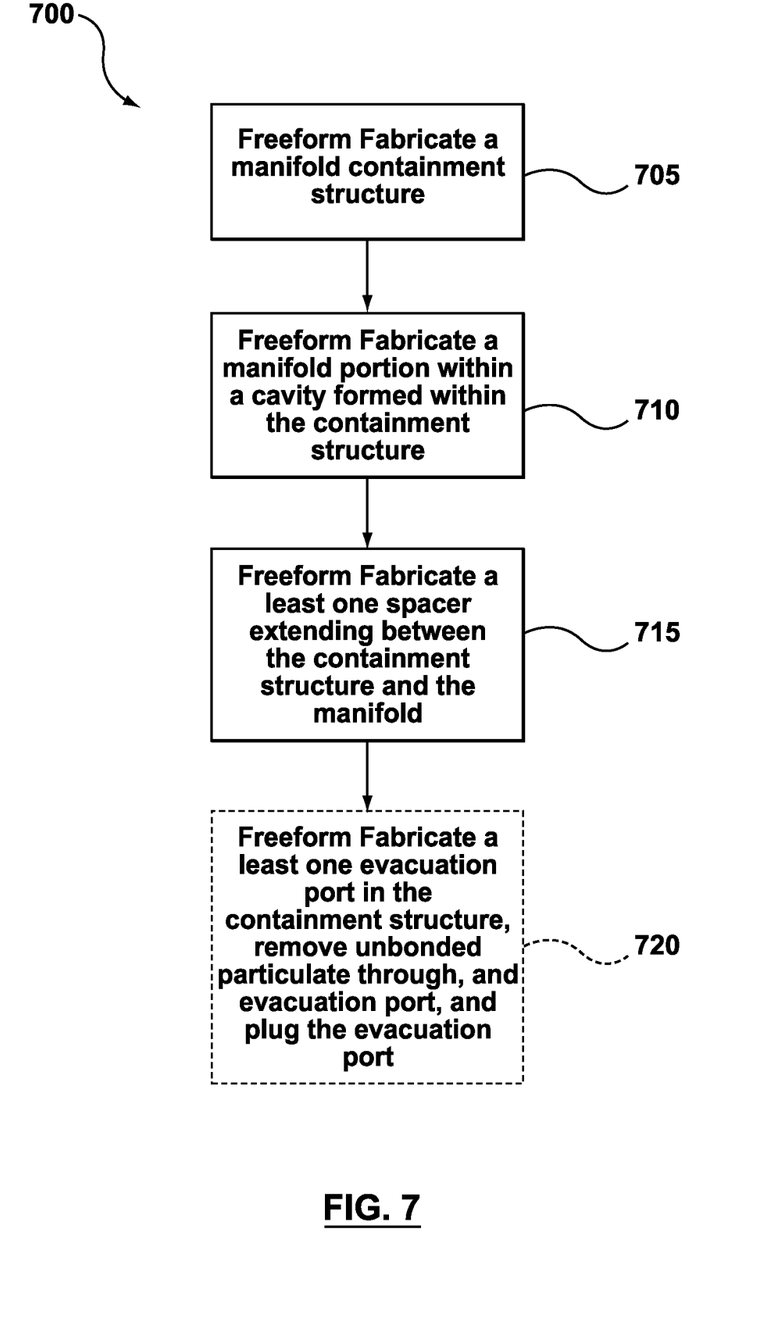
FIG. 7 is a flow diagram illustrating a method of making a unitary monolithically formed injection-molding apparatus according to an aspect of the invention.

FIG. 7 illustrates a method 700 of manufacturing a unitary monolithically constructed injection-molding apparatus according to an aspect of the invention. At step 705, a manifold containment structure is manufactured using freeform fabrication; at step 710, a manifold portion is manufactured within a cavity formed within the manifold containment structure using freeform fabrication; and, at step 715, at least one spacer extending between the manifold containment structure and the manifold is manufactured using freeform fabrication. At optional step 720, if desirable (depending on the type of freeform fabrication being used), a material removal port (or evacuation port) can be manufactured in the manifold containment structure, unbonded particulate/unfused powder can be removed through the material removal port, and the material removal port can be plugged (either permanently or removably, as discussed above). It is noted that, in reality, freeform fabrication rarely follows a method as clean as is shown in FIG. 7; rather, the steps shown in FIG. 7 and described herein could be performed in a different order, could overlap with one another, and may require additional steps. For example, the "freeform fabricate at least one evacuation port in the containment structure" portion of step 720 could be, in some circumstances, included in step 705, while the remaining "remove unbonded particulate through the evacuation port" and "plug the evacuation port" portions of step 720 could remain the last step of the process. Further, the "remove unbonded particulate through the evacuation port" portion of step 720 could include further steps of, e.g., vacuuming the evacuation port, forcing compressed air into the evacuation port, injecting chemical solvents into the evacuation port, and/or any other suitable methods, as discussed above. As is also noted above, more than one evacuation port may be built into the manifold containment structure at step 720 in order to optimize any necessary material removal processes.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An injection-molding apparatus, comprising:
   a unitary monolithic body manufactured using a freeform fabrication process, said monolithic body including:
   a manifold having at least one melt channel; and
   an insulation cavity formed within the monolithic body between an inner portion of said monolithic body and an outer portion of said manifold.

2. The injection-molding apparatus according to claim 1, wherein said insulation cavity substantially surrounds said manifold.

3. The injection-molding apparatus according to claim 2, wherein said monolithic body has an exterior and includes a formation-material evacuation port fluidly communicating between said insulation cavity and said exterior of said monolithic body.

4. The injection-molding apparatus according to claim 3, further comprising a closure sealingly engaged with said formation-material evacuation port.

5. The injection-molding apparatus according to claim 1, wherein said manifold has a sprue structure formed integrally with said manifold using the freeform fabrication process, and wherein said at least one melt channel is in communication with said sprue structure.

6. The injection-molding apparatus according to claim 1, wherein said manifold has a nozzle structure formed integrally with said manifold using the freeform fabrication process, and wherein said at least one melt channel is in communication with said nozzle structure.

7. The injection-molding apparatus according to claim 6, wherein said nozzle structure has a root and a longitudinal axis extending from said root, the injection-molding apparatus further comprising a thermal expansion accommodation portion designed and configured to permit bending of said nozzle structure when said nozzle structure is engaged with a valve gate and said manifold undergoes thermal growth.

8. The injection-molding apparatus according to claim 7, wherein said thermal expansion accommodation portion is located between said nozzle structure and said manifold.

9. The injection-molding apparatus according to claim 7, wherein said nozzle structure has a first elastic section modulus and said thermal expansion accommodation portion comprises a second elastic section modulus smaller than said first elastic section modulus.

10. The injection-molding apparatus according to claim 7, wherein said nozzle structure comprises a first material and said thermal expansion accommodation portion comprises a second material different from said first material.

11. The injection-molding apparatus according to claim 1, wherein said nozzle structure has a root and a longitudinal axis extending from said root, the injection-molding apparatus further comprising a thermal expansion accommodation portion designed and configured to permit bending of said nozzle structure when said nozzle structure is engaged with a valve gate and said manifold undergoes thermal growth.

12. The injection-molding apparatus according to claim 11, wherein said thermal expansion accommodation portion is located between said nozzle structure and said manifold.

13. The injection-molding apparatus according to claim 11, wherein said nozzle structure extends from a flexible, resilient portion.

14. The injection-molding apparatus according to claim 13, wherein said nozzle structure comprises a first elastic section modulus and said thermal expansion accommodation portion comprises a second section modulus smaller than said first elastic section modulus.

15. The injection-molding apparatus according to claim 13, wherein said nozzle structure comprises a first material and said thermal expansion accommodation portion comprises a second material different from said first material.

16. The injection-molding apparatus according to claim 1, further comprising at least one spacer extending between said inner portion of said monolithic body and said outer portion of said manifold within said insulation cavity, wherein said at least one spacer is formed integrally with said monolithic body and said manifold by the freeform fabrication process.

17. The injection-molding apparatus according to claim 16, wherein said manifold is made of a first material having a first thermal conductivity, and said at least one spacer is made of a second material having a second thermal conductivity lower than said first thermal conductivity.

18. A method of manufacturing a monolithically constructed injection-molding apparatus, the method comprising:
   freeform fabricating a manifold containment structure;
   freeform fabricating a manifold portion within the manifold containment structure so that, when the injection-molding apparatus is complete, the manifold portion is located within a cavity formed within the manifold containment structure; and freeform fabricating at least one spacer extending between the manifold containment structure and the manifold within the cavity in a manner that the at least one spacer is monolithically continuous with each of the manifold containment structure and the manifold.

19. The method according to claim 18, wherein each of said freeform fabricating steps is performed using a particulate-additive technique that results in the cavity being filled with unbonded particulate, the method further comprising removing the unbonded particulate from the cavity.

20. The method according to claim 19, wherein said freeform fabricating a manifold containment structure includes freeform fabricating the manifold containment structure to include an evacuation port, and said removing the unbonded particulate from the cavity includes removing the unbonded particulate via the evacuation port.

21. The method according to claim 20, wherein said removing the unbonded particulate includes at least one of: applying a vacuum to the evacuation port, forcing a gas or liquid into the evacuation port, and draining materials from the evacuation port.

22. The method according to claim 20, further comprising, following said removing the unbonded particulate, closing the evacuation port.

23. The method according to claim 18, wherein said freeform fabricating the manifold portion includes freeform fabricating the manifold portion with a first material having a first thermal conductivity and said freeform fabricating at least one spacer includes freeform fabricating the at least one spacer with a second material having a second thermal conductivity lower than the first thermal conductivity.

24. The method according to claim 18, the method further comprising freeform fabricating a sprue structure as a portion of the manifold portion.

25. The method according to claim 18, the method further comprising freeform fabricating a nozzle structure as a portion of the manifold portion.

26. The method according to claim 25, the method further comprising forming a flexible, resilient portion from which the nozzle structure extends.

27. The method according to claim 26, the method further comprising forming, via freeform fabrication, the nozzle structure with a first elastic section modulus and forming the flexible, resilient portion with a second elastic section modulus smaller than the first elastic section modulus.

28. The method according to claim 26, the method further comprising forming the nozzle structure from a first material and forming the flexible, resilient portion from a second material different from the first material.

29. The method according to claim 18, the method further comprising freeform fabricating a sprue structure and a nozzle structure as portions of the manifold portion and forming at least one melt channel to be in communication with the sprue structure and the nozzle structure.

30. The method according to claim 29, the method further comprising freeform fabricating a flexible, resilient portion from which the nozzle structure extends.

31. The method according to claim 29, the method further comprising forming the nozzle structure with a first elastic section modulus and forming the flexible, resilient portion with a second elastic section modulus smaller than the first elastic section modulus.

32. The method according to claim 29, the method further comprising forming the nozzle structure from a first material and forming the flexible, resilient portion from a second material different from the first material.

\* \* \* \* \*